June 3, 1930.                B. M. SHIPLEY                1,761,689
                              CASH REGISTER
                          Filed March 17, 1924            5 Sheets-Sheet 1

Inventor
Bernis M. Shipley
By Carl Beust
   Henry E. Stauffer
His Attorneys

June 3, 1930.                B. M. SHIPLEY                1,761,689
                              CASH REGISTER
                         Filed March 17, 1924        5 Sheets-Sheet 2

Inventor
Bernis M. Shipley
By Earl Beust
Henry E. Stauffer
His Attorneys

June 3, 1930.                B. M. SHIPLEY                1,761,689
                              CASH REGISTER
                           Filed March 17, 1924          5 Sheets-Sheet 4

Inventor
Bernis M. Shipley
By
His Attorneys

June 3, 1930.　　　B. M. SHIPLEY　　　1,761,689

CASH REGISTER

Filed March 17, 1924　　　5 Sheets-Sheet 5

Inventor
Bernis M. Shipley
By Carl Beust
Henry Stauffer
His Attorneys

Patented June 3, 1930

1,761,689

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed March 17, 1924. Serial No. 699,919.

This invention relates to cash registers and is conveniently embodied in the form of improvements to the cash register shown and described in United States Letters Patent, No. 1,626,880, issued on May 3, 1927, to the present inventor.

One object of this invention is to increase the ease and speed with which the above mentioned machine can be operated, by providing means to automatically arrest the total lever in the position to which it should be moved to accomplish the desired operation.

Another object is to provide means for retaining certain keys in their depressed positions during a plurality of operations.

Another object is to release said keys automatically under the control of a certain other key.

Still another object is to provide a special counter operating mechanism which is normally inoperative and is made operative only on an operation during which a certain key is depressed.

With these and incidental objects in view, the invention consists of certain novel features of construction and combinations of parts, the essential elements of which are set forth in appended claims, and a preferred form or embodiment of which is hereinafter described with reference to the drawings which accompany and form part of this specification.

General statement

This invention is shown applied to a machine specially designed for use in a large mail order establishment, but while the preferred form of the invention is as shown herein, it would be extremely useful in connection with any machine of this general type, and it is not intended to limit its usage to the particular machine shown.

In mail order institutions, such as the one for which the present machine was designed, a large number of orders for various kinds of merchandise are received daily. It is desirable to segregate the business received from each State or other division, and this is done by providing a plurality of totalizers, one for each State, and a key on the keyboard for selecting the proper totalizer. The machine is adapted to keep a total of all of the business entered, in addition to a total of the business from each State. Some of the orders are for a plurality of articles and this machine will print each item, add the items, and print the total thereof. It is believed to be unnecessary to give any further description herein of the general usage of this machine, as it is very fully described in the Patent No. 1,626,880 above referred to.

Keyboard

This machine is provided with a plurality of banks of amount keys for entering amounts of money. These keys are not shown or described herein, as they form no part of the present invention and can be seen in the patent above referred to.

Figures 1, 3, 4, 5:
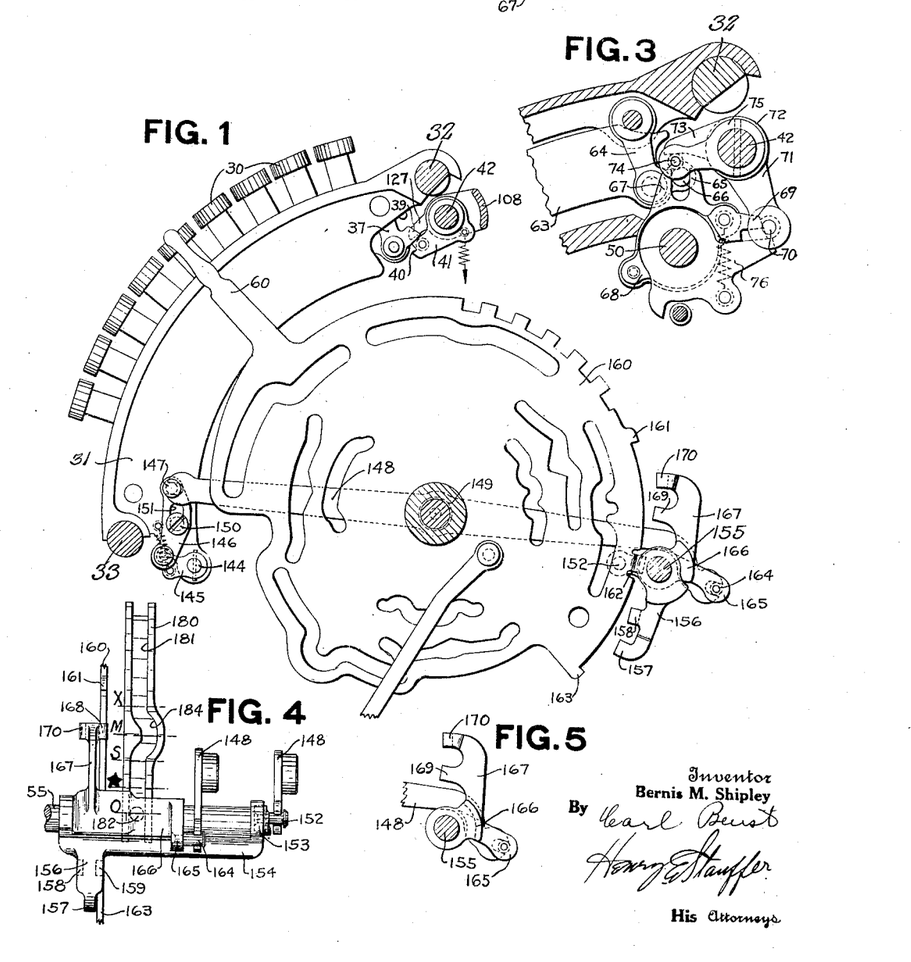
Fig. 1 is a side elevation of the "Ga.-Me." view in State bank, showing the total lever plate and the means for operating the upper total lever stop.
Fig. 3 is a detail sectional view in side elevation of the release mechanism.
Fig. 4 is a detail view in rear elevation, showing the cam for shifting the total lever stops under control of the release bank.
Fig. 5 is a detail side view of the upper total lever stop.
Figures 6, 7, 8, 9:
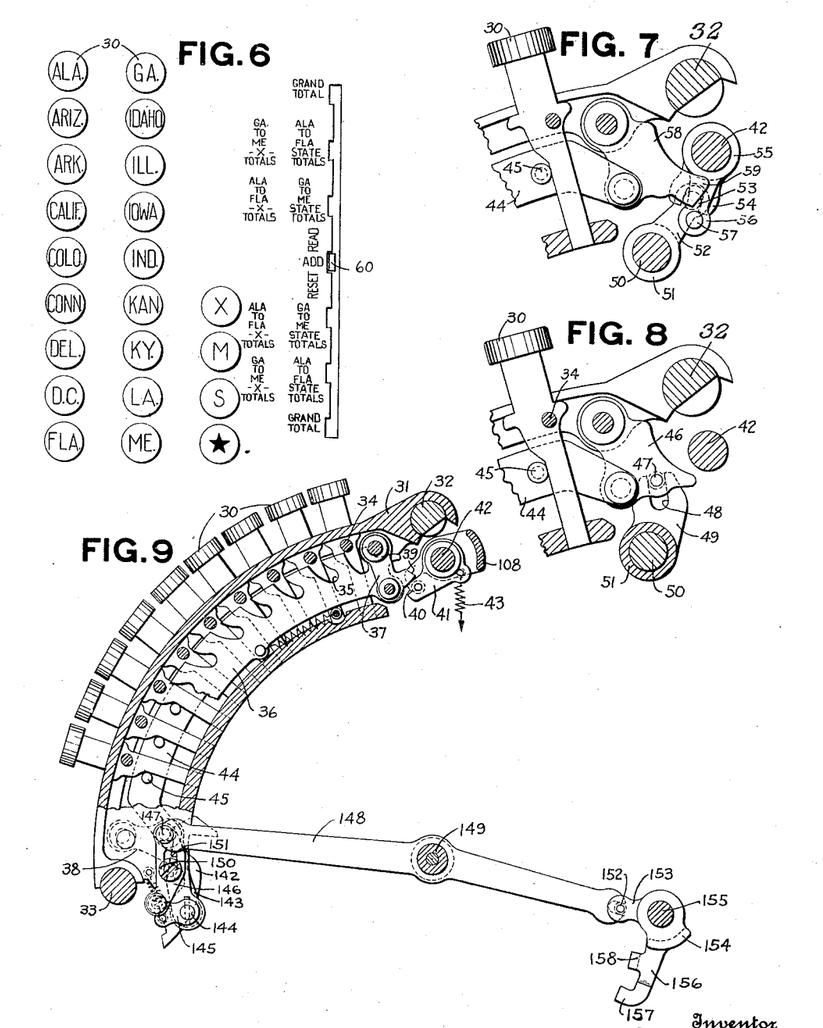
Fig. 6 is a diagrammatic view of the State keys, the release keys, and the total lever.
Fig. 7 is a detail sectional view in side elevation, showing the interlocking mechanism operated by the "Ga.-Me." bank.
Fig. 8 is a similar view showing the interlocking mechanism operated by the "Ala.-Fla." bank.
Fig. 9 is a detail side elevation, partly in section, of the "Ala.-Fla." bank, showing its connection to the lower total lever stop.

There are two banks of keys, which will be known herein as "State" keys, 30. These banks of keys are shown in Figs. 1, 6 and 9. Each of the State keys controls the selection of its corresponding totalizer, as well as printing and indicating mechanism, in a well known manner as shown respectively in the patents to Fuller 1,242,170, granted October 9, 1917, and 1,163,748, granted December 14, 1915. The two banks of State keys are identical, and therefore it is thought that the description of one of these banks will be sufficient for both. The keys 30 are slidably mounted in a key frame 31 supported at its upper end on a rod 32 and at its lower end on a rod 33, which rods are mounted in the machine side frames. The keys are held in their normal, undepressed positions by means of springs, not shown herein, but well known in machines of this type. Each of the keys 30 carries a pin 34 adapted to cooperate with a curved slot 35 formed in a detent bar 36, which at its upper end is pivotally connected to an arm 37, and at its lower end, to an arm (not shown). When a key is depressed in either of the State banks, it is evident that the detent bar 36 will be moved downwardly (Fig. 9) until a nose 39 on the arm 37 enters a notch 40 cut in an arm 41 loosely mounted on a key-release shaft 42 extending across the machine. The arm 41 tends to rock constantly in a clockwise direction due to a spring 43 attached thereto. When the nose 39 enters the notch 40, the detent 36 will be held in its lowered position and the depressed key will therefore be held depressed. The means for releasing the State keys at the proper time will be hereinafter described.

It is evident that two State keys should not be depressed during the same operation, and therefore means are provided to make this impossible. A locking bar 44 is provided in each of the banks of State keys, and carries a plurality of pins 45, one of said pins being adjacent the shank of each of the keys 30. The key shanks are formed with beveled portions in position to cooperate with their respective pins 45, and when depressed they move the locking bar 44 downwardly. When a key is depressed in the "Ala.-Fla." bank, shown in Fig. 8, the locking bar 44 is moved downwardly, and as this bar at its upper end, is pivoted to an arm 46, this arm will be rocked clockwise. The arm 46 carries a pin 47 which cooperates with a slot 48 in an arm 49 loosely mounted on a shaft 50. The arm 49 is connected by a hub 51 to an arm 52 (Fig. 7) appropriate to the "Ga.-Me." bank. This arm 52 carries a pin 53 cooperating with a bifurcated arm 54 loosely mounted on the shaft 42. The arm 54 is connected by a hub 55 to an arm 56 which carries a pin 57. The locking bar 44, of the "Ga.-Me." bank, is pivoted at its upper end to a link 58 (Fig. 7) having a nose 59 adapted to cooperate with the pin 57. When, therefore, a key in the "Ala.-Fla." bank is depressed, the arm 49, hub 51, and arm 52 are rocked counter-clockwise. This movement is transmitted to the bifurcated arm 54 and through hub 55 and arm 56 to the pin 57, which is moved into the path of the nose 59 of the arm 58 for the "Ga.-Me." bank, thus making it impossible to depress a key in this bank.

If, on the other hand, a key is first depressed in the "Ga.-Me." bank, the arm 58 will be rocked clockwise far enough to bring the flat end of the nose 59 thereof into the path of the pin 57 carried by the arm 56. As the arm 56 could not then be rocked in a clockwise direction, no key could be depressed in the "Ala.-Fla." bank.

The keys in the last bank to the right (Figs. 6 and 10) are the release keys. It is necessary to depress one of the keys in this bank on every operation of the machine in order to release the machine, which is normally locked. The uppermost one of the release keys is designated the "X" key. This key is used to release the machine whenever the order being entered consists only of a single item and also when it is desired to print the total of a plurality of items on a single order. Next below the "X" key is the "M" key, which is used only to release the machine when entering the individual items of a multiple item or mixed order. Below the "M" key is the "S" key, which is used when taking totals of the business accumulated on any State totalizer. The lowest key in this bank is known as the "black star" key, and it is used only when it is desired to take a grand total of all the items entered in all the State totalizers. The release keys are slidably mounted in a key frame 31, identical with the key frame for the State keys above described. It is not believed that any further description of this mechanism need be given here.

To the right of the release bank is the total lever 60 (Figs. 1 and 6). The use of this lever is well known in machines of this type, and no further description thereof will be included at this point.

Release mechanism

Figure 2:
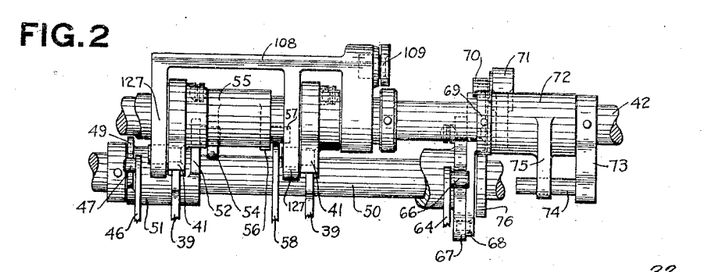
Fig. 2 is a detail top plan view of the release mechanism and the latches for holding the State keys depressed.

As above mentioned, this machine is normally locked, and it is necessary to depress one of the keys in the release bank in order to unlock the machine for operation. Each of the release keys carries a pin 61 (Fig. 10), projecting laterally from its shank adapted to cooperate with a curved slot 62 formed in a release bar 63 supported at its upper end by a link 64 pivoted on the key frame, and at its lower end in the conventional manner. The link 64 (Fig. 3) has a projecting foot 65 which carries a pin 66 cooperating with a bifurcated arm 67 loosely mounted on the shaft 50. This arm 67 has attached thereto a release pawl 68 which has a nose 69 normally in contact with a flattened stud 70 carried by an arm 71 fast on a hub 72 (see also Fig. 2) loose on the shaft 42. The hub 72 also carries a projecting arm 73 which contacts with a pin 74 carried by an arm 75 fast on the shaft 42. As described in the above mentioned Patent 1,626,880 this shaft 42 is normally under spring tension and tends to rock in a clockwise direction (Fig. 3) for the purpose of closing the motor circuit and thus operating the machine. It is apparent, however, that so long as the nose 69 of the release pawl 68 is in contact with the flattened stud 70 on arm 71, this arm, and therefore the arm 73, will be held against movement. As the stud 74 on the arm 75 contacts with the arm 73 it is evident that this arm, and therefore the shaft 42, will be prevented from moving to their releasing positions.

When, however, a release key is depressed and the release bar 63 moved downwardly, the stud 66 carried by the foot 65 of link 64 will rock the arm 67, and the release pawl 68 in a counter-clockwise direction, and move the nose 69 away from the stud 70. The arm 71 and arm 75 are thereby permitted to rock clockwise under the influence of the spring (not shown) to release the machine. Also loose on the shaft 50 adjacent the release pawl 68 is what is known in the art as a "non-repeat pawl" 76. The action of this pawl prevents an immediate second operation of the machine should the operator retain a release key depressed at the end of an operation, as fully described in the patent to Fuller 1,242,170 referred to.

Differential mechanism

Figure 10:
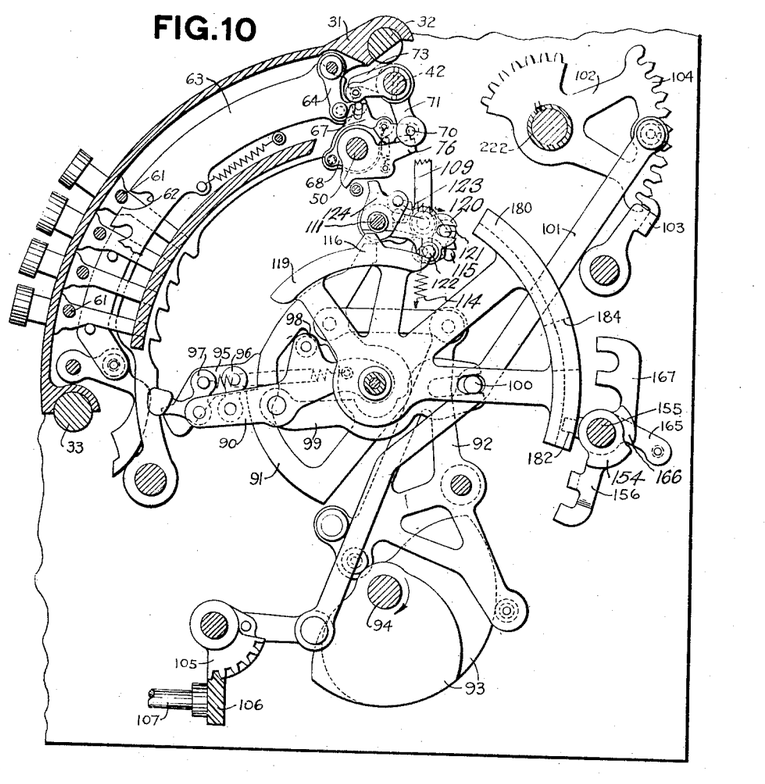
Fig. 10 is a sectional view through the machine taken just to the right of the release bank.

Cooperating with each of the banks of State keys and with the release bank is a differentially movable arm 90 (Fig. 10). Each arm 90 is driven in a clockwise direction by a segment 91 which is given a constant excursion on every operation by means of a Y-shaped lever 92 and a pair of cams 93 fast on the main drive shaft 94. The differentially movable arm is latched to the driving segment on its clockwise movement by a latch 95 carried by a link 96 and a bell crank lever 97, both supported by said differentially movable arm.

The arm 90 is disconnected from the driving segment when the bell crank lever 97 comes into contact with the inner end of the depressed key. The differentially movable arm is returned to its home position on every operation by the engagement of a surface 98 on the driving segment 91 with a pin on said arm.

Pivoted to the arm 90 is a beam 99, which, at its opposite end, is bifurcated and straddles a pin 100 carried by a link 101. At its upper end this link is pivoted to an indicator-setting segment 102, which is thereby set in accordance with the positioning of the differentially movable arm 90 in a manner well known in the art. An aliner 103 cooperates with alining teeth 104 on said indicator setting segment.

At its lower end the link 101 is connected to a spiral segment 105 which meshes with a spiral gear 106 fast on a shaft 107, which in turn, through well known connections, sets up the proper figures or letters on an appropriate typewheel.

Mechanism for releasing State keys

Figures 13, 14, 15, 16:
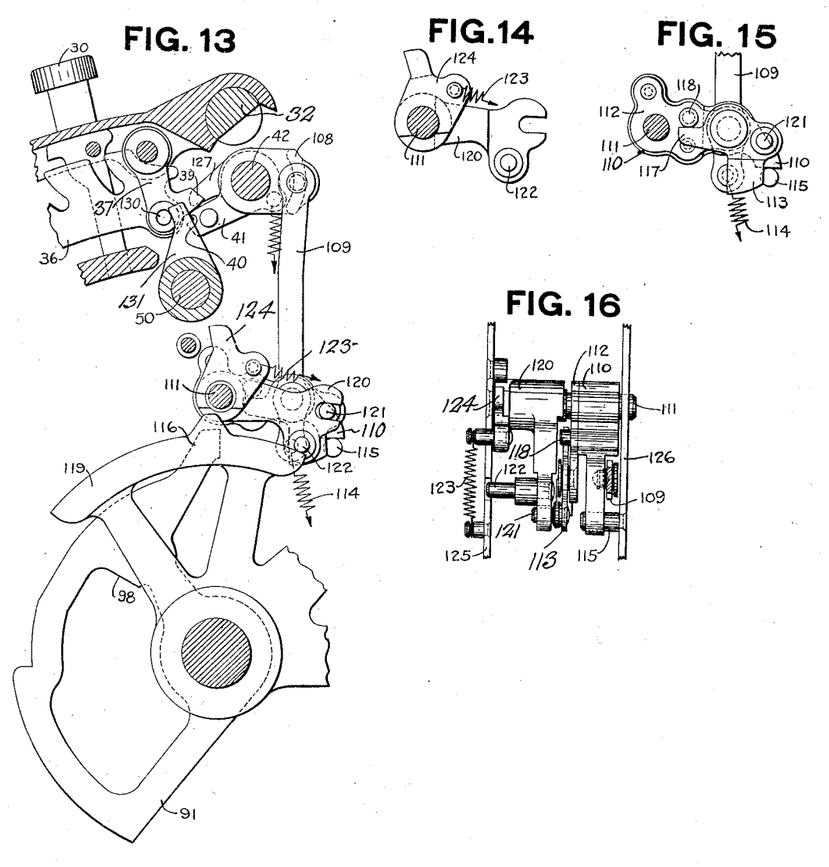
Fig. 13 is a detail sectional view in side elevation of the mechanism for controlling the release of the State banks.
Fig. 14 is a detail side view of a portion of the State key releasing mechanism.
Fig. 15 is a similar view through the State key releasing mechanism, showing the parts behind those shown in Fig. 14.
Fig. 16 is a top view of the mechanism shown in Figs. 14 and 15.

As before noted, many of the orders which are received call for a plurality of items, and in order to save the operator's time and prevent the possibility of mistakes, mechanism is provided for holding a depressed State key in its depressed position during a plurality of operations until the total of the items making up the order is taken, whereupon the key will be released automatically and permitted to return to its normal, undepressed position. It has been described above how the State keys are latched in their depressed positions. The mechanism for releasing the State keys will now be described. The arms 41 for each of the State key banks are operated to release the State keys by a yoke 108 (Figs. 1, 2, 9 and 13), loosely mounted on the release shaft 42. Pivoted to the right hand end of this yoke is a downwardly extending link 109 (Fig. 13), which, at its lower end, is pivoted to a lever 110 (Figs. 15 and 16). This lever is loosely mounted on a cross rod 111 and has fastened thereto an arm 112 upon which is pivoted a pawl 113. The lever 110 tends to rock normally in a clockwise direction, due to a spring 114 (Fig. 15), which is connected to the lower end of link 109. This movement, however, is limited by the engagement of the right hand end of the lever with a stationary pin 115.

This mechanism is in the plane of the differential mechanism for the release bank, and the driving segment 91 for this bank has a finger 116 thereon (Figs. 10 and 13), which, when the segment 91 is given its clockwise movement as before described, will come into contact with the pawl 113 and will rock this pawl counter-clockwise (Fig. 15) about its pivot until the projection passes the pawl, whereupon the pawl will return to the position shown in Fig. 15, in which position it is stopped by the engagement of a nose 117 on the pawl with a pin 118 on the arm 112. Then upon the return, or counter-clockwise movement, of the segment 91, the finger 116 thereof will engage with the lower curved edge of the pawl 113 and raise the pawl, the arm 112 and lever 110. This will, in turn, rock the yoke 108 counter-clockwise through the link 109. The yoke carries two arms 127 (Figs. 2 and 13) adapted to cooperate with the arms 41 so that when the yoke is rocked, the arms 41 will be moved away from the noses 39. Each detent bar 36 can then move upwardly until it is arrested by the engagement of a stud 130 (Fig. 13) carried by link 37 with an arm 131 sleeved on the arm 67. Near the end of the operation of the machine, the release pawl 68 and arm 67 are returned to their normal positions, whereupon the arm 131 is rocked clockwise, thereby permitting the detent 36 to continue its upward movement to permit the depressed key to return to its undepressed position. This mechanism is shown and described in the patent to Shipley, No. 1,619,796, issued March 1, 1927.

This operation, as just described, takes place whenever the machine is operated with a State key depressed and with any of the release keys depressed, except the "M" key. It will be remembered that the "M" key is used when entering the items of a mixed order. So long as items are being entered and the "M" key is being depressed, it is not desired to have the State key released, and therefore mechanism is provided to disable the State key releasing mechanism whenever the "M" key is depressed, as follows: Pivotally mounted on the same center as the driving segment 91 for the release bank is a segmental cam 119 (Figs. 10 and 13), which has one high spot or node appropriate to the "M" key. As shown in Fig. 10, the segmental cam 119 is connected to the differential mechanism through the pin 100, previously described, which extends laterally through a slot in an arm rigid with the cam 119. It is evident, therefore, that the cam 119 will be differentially positioned in accordance with the key depressed in the release bank. Loosely mounted on the rod 111 is a lever 120 (Figs. 13, 14 and 16), bifurcated to cooperate with a stud 121 carried by the pivoted pawl 113. The lever 120 also carries a stud 122 which contacts with the periphery of the segmental cam 119. The lever 120 is normally held in contact with the segmental cam by a spring 123 stretched between a pin carried by an upwardly extending arm 124 of the lever 120 and a pin carried by a frame 125, which together with a similar frame 126 (Fig. 16), supports this mechanism.

If the "M" key is depressed in the release bank, the segmental cam 119 will be positioned by the differential mechanism whereby the node of the cam will raise the pin 122 and rock the lever 120 counter-clockwise (Fig. 13). This movement of the lever 120 rocks the pawl 113 counter-clockwise. Then when the driving segment 91 is given its clockwise and then its counter-clockwise movement, the finger 116 thereof will not come into contact with the pawl 113, and therefore the arm 112 and the lever 110 will not be rocked counter-clockwise. The link 109, yoke 108 and arms 127 and 41 will, therefore, remain in the positions which they assumed upon the depression of a State key and the key will not be released.

Total lever stops

In order to facilitate the operation of the machine and to prevent errors due to carelessness on the part of the operator in manipulating the total lever 60, mechanism is provided for automatically stopping this lever in the correct positions corresponding to the particular keys depressed. The means whereby these stops are set will now be described.

It can be seen from Fig. 6 that the total lever has six positions besides its adding position, three of these positions being above the adding position and three below. The uppermost and lowermost of these positions are for taking a subtotal and total respectively from the grand total totalizer. As these positions are located at the extreme ends of the total lever slot, it is evident that no stops need be provided for the total lever 60, as the ends of the slot will act as stops. This leaves four positions of the total lever in which automatic stops are provided for by this invention.

The most common totalizing operation in this machine is that of taking a total of a mixed (multiple-item) order. When this total is to be taken, the total lever is moved either up or down to its first or second position, the position depending upon the State from which the order was received. If the mixed or multiple-item order was received from one of the States included in the Ala.-Fla. bank, the total lever will be moved to its first position either above or below its adding position, depending upon whether a subtotal or total is desired. Usually the total is taken of a mixed or multiple-item order, in which case, the total lever is moved to its first position below adding. If, however, the mixed or multiple-item order is from one of the States represented in the Ga.-Me. bank, the total lever is moved to its second position either above or below its adding position.

As previously described each of the State banks 30 (Fig. 9) is provided with a locking bar 44 carrying a plurality of pins 45 adapted to cooperate with inclined shoulders on the shanks of each of the State keys. Therefore, when a State key in either bank is depressed, the locking bar 44 will be moved downwardly. At its lower end, each of these locking bars is connected to a hooked arm 142, the function of which is well known in machines of this type. This hooked arm cooperates with a pin carried by an arm 143 fast on a shaft 144 supported by the lower end of the key frame. Also fast on this shaft is an arm 145 (see also Fig. 1) to which is pivoted a link 146 which at its upper end carries a pin 147 projecting through the bifurcated end of a lever 148 loosely mounted on a stud 149 supported by the differential hangers for the State bank. The link 146 is guided by a pin 150 which projects through a slot 151 in the link and is carried by the key frame 31. Both of the banks of State keys are equipped with the above described mechanism and it is thought that a description of one of these banks will be sufficient for both.

At its opposite end the lever 148 (Fig. 9) appropriate to the Ala.-Fla. bank is bifurcated and cooperates with a pin 152 carried by an arm 153 integral with and projecting forwardly from a yoke 154 (Figs. 4, 9 and 12) loosely mounted on a rod 155 supported by the machine side frames. Also integral with the yoke 154 and depending therefrom is an arm 156 having three laterally projecting stops 157, 158 and 159 located thereon. The stops 158 and 159 lie in the same horizontal plane and are spaced apart from each other to enable the selection of either exclusively, as hereinafter explained.

The total lever 60 is integral with a disk 160 of well known design, which carries three successively spaced lugs 161, 162 and 163 (Fig. 1) projecting from its periphery. The lug 162 and the lug 163 are adapted to cooperate with the stops 157, 158 and 159 on the arm 156 in a manner which will be hereinafter described. The intermediate lug 162 is offset laterally (Figs. 11 and 12) relatively to the lugs 161 and 163 to enable a more flexible selection, as hereinafter explained.

The lever 148 for the Ga.-Me. bank is bifurcated at its right hand end (Figs. 1, 10 and 11) and cooperates with a pin 164 carried by an arm 165 integral with and projecting rearwardly from a yoke 166 also loosely mounted upon the rod 155. Integral with and projecting upwardly from the yoke 166 is an arm 167 provided with three stops 168, 169 and 170 adapted to cooperate with the spaced lugs 161 and 162 on the total lever plate 160. The stops 168 and 170 are located in the same horizontal plane but spaced apart from each other to permit individual selection as hereinafter explained.

As can be seen in Fig. 1, the arms 167 and 156 carrying the stops are normally out of the paths of the lugs 161, 162 and 163 on the total lever disk. If a key in the Ala.-Fla. bank is depressed, the locking bar 44 for this bank will be lowered, which, through the hooked arm 142, arm 143, shaft 144, arm 145 and link 146, will rock the lever 148 appropriate to this bank in a counter-clockwise direction. This movement, as can be seen from Fig. 9, will move the arm 156 clockwise far enough to bring the stops 157, 158 or 159 into the paths of the lugs 162 and 163 of the total lever disk.

Figure 11:
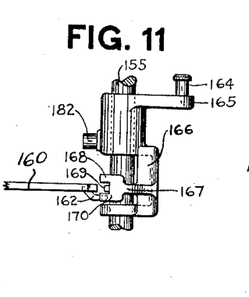
Fig. 11 is a detail top plan view of the yoke connection between the "Ga.-Me." bank and its total lever stop.
Figure 12:
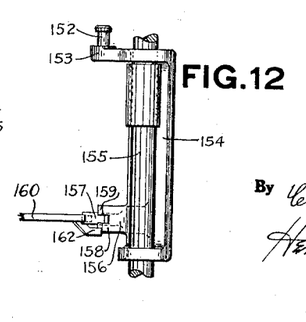
Fig. 12 is a detail top plan view of the yoke connection between the "Ala.-Fla." bank and its total lever stop.

Likewise, the depression of a key in the Ga.-Me. bank will rock its lever 148 and, through the connection shown in Figs. 1 and 5, will rock the arm 167 counter-clockwise to bring the stops 168, 169 or 170 into the paths of the lugs 161 and 162. It will be observed that the offset lug 162 cooperates with stops on both of the arms 167 and 156. This lug 162 is bent, as shown in Figs. 11 and 12, so that it lies to one side of the plane of the total lever disk itself.

The taking of State totals, that is, the total business from each of the States will first be described. When this is to be done, the key 30 appropriate to the State whose total business it is desired to print, is depressed and the total lever 60 is adjusted to the appropriate position. If the State is included in the Ala.-Fla. bank, for instance, the total lever 60 must be adjusted to the second position below adding (Fig. 6) and, when in this position, the "S" key will be depressed, thereby releasing the machine. On such an operation as this, the lower arm 156 which is appropriate to the Ala.-Fla. bank will be rocked clockwise by the depression of the State key in this bank. The arm 156 will be in the position shown in Fig. 4 with relation to the total lever disk 160 and, as the total lever 60 is moved down, the lug 163 will move upwardly. It will pass by the stop 157, as this stop is not now in the plane of this lug, and will then contact with the stop 159 which lies in its path, and the total lever will thereby be positively arrested in its second position below adding.

If, however, a subtotal is desired from this State totalizer, the total lever is rocked upwardly to its second position above adding, moving the lug 162 which, due to its being bent lies in the plane of the stop 157, downwardly between the stops 158 and 159 and into contact with the upper side of the stop 157, thereby positively arresting the total lever in the second position above adding.

If a State total is to be taken of one of the States included in the Ga.-Me. bank, its appropriate key 30 is depressed, and the total lever 60 is moved to its first position below adding. The "S" key is then depressed to release the machine. When a key in the Ga.-Me. bank is depressed, the lever 148 (Fig. 1) appropriate to this bank is rocked counter-clockwise, which movement will rock the arm 167 counter-clockwise and bring the stops 168, 169, 170 carried thereby into position to cooperate with the lugs 161 and 162 on the total lever. The arm 167, in this operation, is in the position shown in Fig. 4 with relation to the total lever disk. Therefore, when the total lever is moved to its first position below adding to take a total, the offset lug 162 will contact the lower edge of the stop 169 and the total lever will be positively arrested in the correct position. If it is desired to read the last mentioned State totalizer, the total lever is moved upwardly and, when this takes place, the upper lug 161 on the totalizer disk will contact with the stop 168 of the arm 167, which has been rocked into its path by the depression of the appropriate State key, and therefore, the total lever disk will be positively arrested in the first position above its adding position.

It is also desired to arrest the total lever plate when "X" totals are taken. These totals, it will be recalled, are the totals of a plurality of items in a mixed or multiple-item order. When a mixed order is entered, the appropriate State key and the "M" key are depressed. Means are provided under the control of the "M" key for shifting the stop-carrying arms 156 and 167 laterally of the machine so as to change the relation of the stops with the lugs 161, 162 and 163 on the total lever disk. The means for shifting the arms 156 and 167 laterally will now be described.

Integral with the segmental cam 119 (Fig. 10), previously described, is another segmental cam 180 which has a cam groove 181 (Fig. 4) formed therein. Cooperating with this groove is a pin 182 carried by the yoke 166, best shown in Fig. 11. The yoke 166 is arranged within the yoke 154 (Figs. 4, 11, and 12) in such a way that movement of one will also move the other. The segment cam 180 is differentially positioned under control of the release bank of special keys at the right of the keyboard (Fig. 10). The cam groove 181 is so designed that there will be no movement of the stop-carrying arms 156 and 167, except when the "M" key is depressed. When, however, this key is depressed and the segment cam 180 is positioned by the release bank differential mechanism, a node 184 of said cam groove will cooperate with the pin 182 and slide the yokes 166 and 154 toward the right (Fig. 4) and maintain them in this position. The arms 156 and 167 are shifted during the entry of items when the "M" key is depressed. If the multiple-item order being entered has been received from one of the States included in the Ala.-Fla. bank, for instance, its appropriate State key has remained depressed during the entry of the items and, therefore, if it is desired to take a total of the items entered, the corresponding group of stops 157, 158 and 159, or 168, 169, 170 will have been properly positioned and all that will be necessary is to move the total lever 60 downwardly until it is automatically arrested. In this case, the arm 156 has been rocked by the depression of a State key in the Ala.-Fla. bank and the depression of the "M" key has moved the levers laterally to the positions shown in Figs. 11 and 12, Fig. 12 showing the lower arm 156 which is controlled by this bank. Therefore, when the total lever is moved down, the lug 163 on the total lever disk will contact the stop 157 on the arm 156 and stop the total lever in its correct position, one step below its adding position. If, for any reason, it is desired simply to read the total of the items entered, and the total lever is moved upwardly, the offset lug 162 will contact with the stop 158 on the arm 156 and stop the total lever in its first position above its normal add position.

If the order being entered is from one of the States represented in the Ga.-Me. bank, then the upper arm 167 will be rocked into cooperative relation with the total lever disk and, when the total lever is moved down to take a total of the items, the offset lug 162 will pass by the stop 169 and will contact with the stop 170 which now lies in its path, thereby stopping the total lever in the second position below its adding position. If a subtotal is desired and the total lever is moved upwardly, the lug 161 will pass between the stops 168 and 170 and contact with the stop 169, thereby stopping the total lever in its second position above its adding position.

It can be seen from the above description that no matter what character of totalizing operation is to be performed, the total lever disk will always be automatically and positively stopped in the correct position without any particular notice being paid to the position of the lever by the operator, and hence the speed at which the machine can be operated, with absolute accuracy, is very greatly increased.

*Special counters*

This machine is provided with a plurality of special step-by-step counters, there being a separate counter appropriate to each of the State keys, a total customer counter and an additional special counter which, in this instance, is adapted to count to twenty-five. In the system used with the present machine, it has been found convenient to place the incoming orders in groups of twenty-five, which groups, after they are entered on the machine, are sent to be filled, and the special counter last mentioned is simply for the purpose of counting the orders so that when twenty-five have been entered, the particular group can be forwarded.

Figures 17, 18, 19, 20, 21:
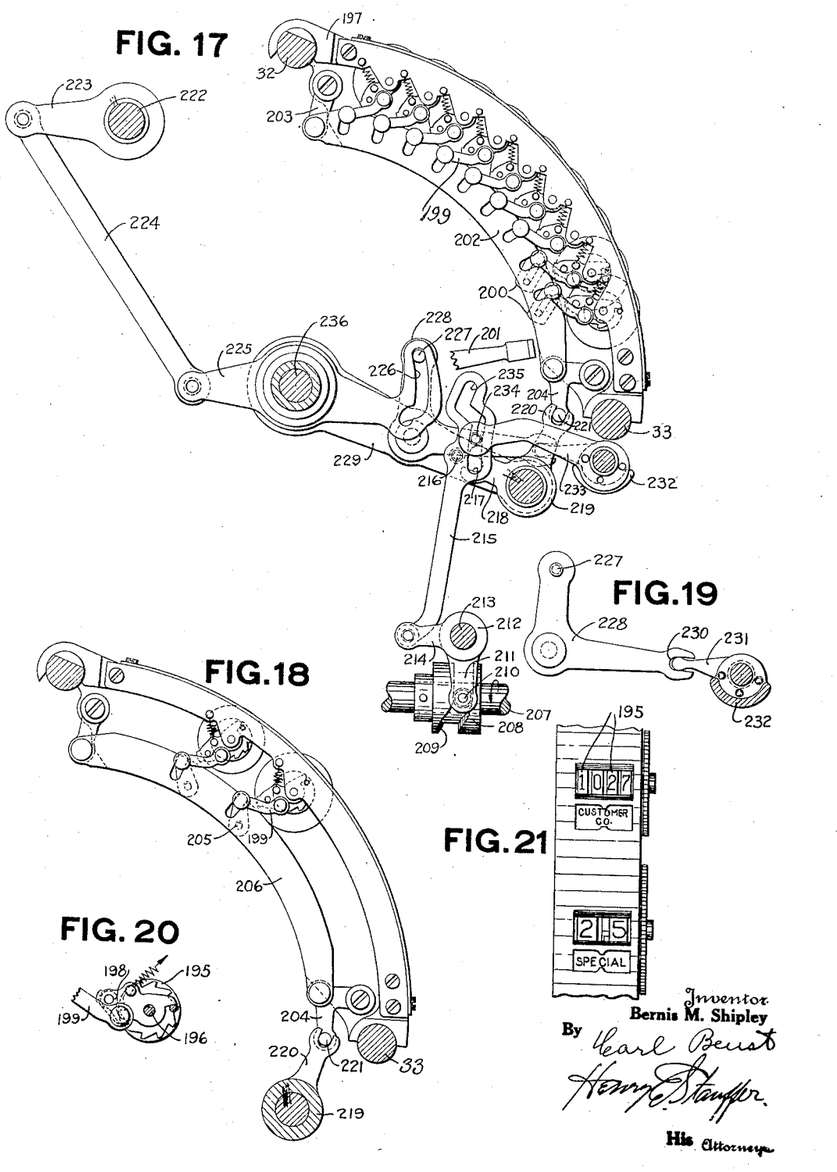
Fig. 17 is a view in left side elevation, showing one bank of the special State counters and the operating means therefor.
Fig. 18 is a detail side view of the "customer" and "special" counter-operating mechanism.
Fig. 19 is a detail side view of the counter disabling arm and finger.
Fig. 20 is a detail view showing the construction of the special counters.
Fig. 21 is a front view of the "customer" and "special" counters.

The counters themselves, as shown in Figs. 17, 18 and 20, are of a well known type. They are shown and described in the patent to F. L. Fuller, No. 1,394,256, issued Oct. 18, 1921, and reference can be made thereto for a detailed description of the same. In view of the above mentioned description, only a very brief description of the counters will be included herein.

Each of the counters comprises a plurality of counter wheels 195 (Fig. 20) loosely mounted on shafts 196 which are in turn supported by a counter supporting frame 197 carried by the cross rods 32 and 33, above mentioned. They are adapted to be given a step-by-step movement by feeding pawls 198 mounted on pawl-carrying levers pivotally supported by the shafts 196. Pivoted to the feeding pawl carrying levers are links 199, which at their opposite ends, are pivoted to slotted links 200 (Fig. 17) slidably mounted on pins mounted in the counter frame. Each of the banks of State counters has a selecting arm 201 appropriate thereto, which is connected to, and is adapted to be differentially set by the differential mechanism for its appropriate State bank. This selecting arm is positioned in line with the free end of the slotted link 200 for the counter to be operated corresponding with the State key depressed.

Each bank of State counters has an operating bar 202 pivoted at its upper end to a link 203 and at its lower end to a bell crank 204 pivoted at one end to the counter frame 197. This operating bar has a plurality of slots cut therein to embrace the pins forming the pivotal point between links 199 and the slotted links 200. When the operating bar 202 is moved downwardly by mechanism, which will be later described, the pins in the ends of the links 199 will also be carried downwardly and the slotted links 200 will slide on their supporting pins, except that link 200 relatively to which the selecting arm 201 has been positioned in cooperative relation. When this occurs, the sliding link 200 for the selected counter will be held against movement and this link and the link 199, therefore, will form a toggle, which, when straightened by the downward movement of the operating bar 202, will rotate the units counter wheel one step to add "one" to the appropriate counter.

The customer counter and the special counter shown in Figs. 18 and 21 are not provided with the sliding links 200 above mentioned, but have their links 199 connected directly to arms 205 pivoted on the counter frame. An operating bar 206 is provided for these two counters which has only two slots therein, and it can be seen, therefore, that whenever the operating bar 206 for these counters is lowered, both of the counters will be actuated.

It is only desired to count in the special counters the total number of orders received from each individual State, and also a total number of all orders received, and therefore the special counter operating mechanism is normally disabled. It is rendered effective only upon depression of the "X" key, as this key is used only in entering orders having a single item only, or in taking the total of a multiple item order. The means for actuating the counter operating bars 202 and 206 will first be explained.

As described in the above mentioned Patent No. 1,626,880, the main drive shaft 94 drives a shaft 207 (Fig. 17) through suitable connections (not shown). This shaft receives a complete rotation in the direction of the arrow, upon every adding and totalizing operation, as it constitutes the main drive shaft of the printing mechanism. Fast on this shaft is a drum cam 208 in which a circumferential cam slot 209 is cut. Cooperating with this slot is a roller 210 carried by an arm 211 fast on a hub 212 on the support 213. The hub 212 carries another arm 214 to which is pivoted a driving link 215 carrying a roller 216 adapted to enter a notch 217 in an arm 218 fast on a suitably supported hub 219. Also fast on the hub 219 are three laterally spaced arms 220 (Figs. 17 and 18) which cooperate with pins 221 carried by the operating bar-supporting bell cranks 204 which are, in turn, pivoted to the counter operating bars 202 and 206 of the respective rows of counters.

The cam 208 is given a complete rotation on every operation of the machine and its cam groove 209 is so designed that the arm 211 and hub 212 are moved first clockwise (Fig. 17) and then counter-clockwise to their normal positions, which movement will rock the arm 214 clockwise, thereby raising the driving link 215. When the counters are to be operated, the roller 216 is rocked into the notch 217 of the arm 218 so that this arm and the hub 219 and arms 220 will be rocked clockwise. Clockwise movement of said hub and arms will rock the bell crank levers 204 counter-clockwise and thereby lower the operating bars 202 and 206 to actuate the selected counters, as above described.

It was above pointed out that the special operating mechanism is only rendered operative upon the depression of the "X" key. The means for rendering this mechanism operative, that is, moving the roller 216 into the notch 217 of arm 218, will now be described.

It has been previously described how the link 101 (Fig. 10) is moved differentially in accordance with the differential movement of the arm 90. When the "X" key is depressed, the arm 90 will move up to the fourth position and this movement will be transmitted to the link 101 and through this link to the segment 102. This segment is fast on a sleeve 222 which also carries an arm 223 (Fig. 17) to which is pivoted a link 224 connected at its lower end to a lever 225 mounted on a stud 236 projecting from the left hand side frame. At its right hand end the lever 225 has a cam slot 226 formed therein through which projects a pin 227 of a bell crank 228 pivoted on a rigid bar 229. The other arm of this bell crank 228 has a bifurcated end 230 with which embraces the end of a finger 231 (Fig. 19). The finger 231 is fast to a yoke 232 which also carries an arm 233 (Fig. 17) having a pin 234 which projects through a cam slot 235 formed in the counter actuating link 215. When the "X" key is depressed, as above noted, and the segment 102 is moved differentially through link 101, this movement will be transmitted by the sleeve 222, arm 223, and link 224, to the lever 225 which will be rocked counter-clockwise (Fig. 17). The lower portion of the slot 226 in the lever 225 is offset and when this offset portion comes into contact with the pin 227, it moves this pin and the bell crank 228 counter-clockwise. This movement of the bell crank 228 will rock the finger 231, yoke 232, and arm 233 clockwise and, due to the shape of the cam slot 235 in the link 215, this link will be rocked clockwise about its pivot to seat the roller 216 in the notch 217 of the arm 218 to render the counter operating mechanism effective.

If any of the release keys, except the "X" key, are depressed, the lever 225 will be moved to a less extent and, as the part of the cam slot 226, corresponding to the "M", "S" and black star keys, is concentric with the stud 236, no movement will be given to the bell crank 228 and, therefore, the roller 216 will not enter the notch 217 of arm 218. Now when the actuating link 215 is raised, due to the rotation of the cam 208, its movement will be idle, and nothing will be added on the special counters.

Operation

A brief description of the operation of the machine will now be given. As the orders are received, they are turned over to the operator who enters them on the machine. We will consider first the entry of orders which contain only a single item. The operator places the order sheet on which the items of an order have been entered in the machine, and depresses the amount keys corresponding to the selling price. He then depresses the State key corresponding to the State from which the order was received, and lastly, he depresses the "X" key which releases the machine. The machine is then operated and prints the amount on the order sheet as well as on a detail strip, adds the amount into the totalizer appropriate to the State key depressed, and also into a grand total totalizer.

If the next order entered is what is known as a mixed order, that is, an order containing a plurality of items, the operator inserts the order sheet in the machine, depresses the amount keys corresponding to the first item, then depresses the State key corresponding to the State from which the order was received, and lastly, he depresses the "M" key which releases the machine. The machine is then operated and the order sheet remains in the machine, and the amount of the next item is set up on the amount keys. The State key which was depressed on the entry of the first item remains depressed and, therefore, the operator simply has to again depress the "M" key. This operation continues until all of the items constituting the multiple-item order have been entered and the operator is ready to take the total of this order. He then moves the total lever 60 to the first or second positions below adding, depending upon which State key is depressed. The lever is automatically arrested in the proper position by the appropriate total lever stop which has been set by the State key in conjunction with the "M" key.

The depression of the "X" key releases the machine and upon subsequent operation thereof the total of the items entered is added on the appropriate State and grand total totalizers and is printed on the order sheet. "One" is added on the special counter appropriate to the State from which the order was received, on the total customer counter, and on the special counter.

If it is desired to take a total of any of the State totalizers, the key appropriate thereto is depressed and then the "S" key in the release bank is depressed. Previously to the depression of the "S" key, the total lever 60 will be moved to the proper position where it will be automatically stopped, as before described. The machine is released by the depression of the "S" key and the movement of the release bank differential mechanism will disable the special counter actuating mechanism so that none of the special counters will be actuated. If a total of all the States is desired, the total lever is, first, moved down to its lowermost position and the black star key is depressed, which will release the machine, disable the special counters and cause the grand total of the accumulations of all the States to be printed. It is apparent that no stops are necessary when the total lever is moved to either of the grand total positions, as the ends of the slot (Fig. 6) will stop the lever in these positions.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a cash register, the combination of a plurality of banks of classification control keys, a substantially circular plate adapted to be oscillated on its axis, and means for stopping said plate in any one of a plurality of positions under control of said banks of keys.

2. In a cash register, the combination of a plurality of banks of classification control keys, a plate adapted to be oscillated in both directions on its axis, means for manually adjusting said plate to a plurality of positions, and a plurality of positioned stops, each stop adapted to stop said plate in one of said positions under control of said banks of keys.

3. In a cash register, the combination of a plate adapted to be oscillated in both directions on its axis, means for manually adjusting said plate, a plurality of projections carried by said plate, a plurality of banks of classification control keys, and a plurality of stops adapted to be moved into the path of said projections to stop said plate under control of said banks of keys.

4. In a cash register, the combination of a plate having a plurality of projections thereon, manipulative means for moving said plate, and a plurality of pivoted stop levers adapted to cooperate with said projections to stop said plate in different positions.

5. In a cash register, the combination of a plate having a plurality of projections thereon, manipulative means for moving said plate, a plurality of pivoted stop levers adapted to cooperate with said projections, a plurality of manipulative means for controlling the pivotal movement of said levers, and means for moving said stop levers laterally on their pivots.

6. In a cash register, the combination of a plate having a plurality of projections thereon, manipulative means for moving said plate, a plurality of pivoted stop levers adapted to cooperate with said projections, a plurality of manipulative means for controlling the pivotal movement of said levers, a cam means for moving said stop levers laterally on their pivots, and a manipulative device for controlling the movement of said cam.

7. In a cash register, the combination of a plate adapted to be moved to one of a plurality of positions, a plurality of projections on said plate, a plurality of pivoted levers adapted to cooperate with said plate and each having a plurality of stops located in different planes, and means for shifting said levers to bring a certain one of said stops into the plane of said plate.

8. In a cash register, the combination of a plate adapted to be moved to one of a plurality of positions, a plurality of projections on said plate, a pivoted lever having a plurality of stops located in different planes, means for shifting said lever to bring a certain one of said stops into the plane of said plate, and other means for rocking said lever to bring said certain one of the stops into the path of one of the projections on said plate.

9. In a cash register, the combination of a plate adapted to be moved to one of a plurality of positions, a plurality of projections on said plate, a plurality of pivoted levers adapted to cooperate with said plate and each having a plurality of stops located in different planes, means for moving said levers into cooperative relation with said projections, and a manipulative device for controlling said means for shifting said levers in one direction.

10. In a cash register, the combination of a plate adapted to be moved to one of a plurality of positions, a plurality of projections on said plate, a plurality of pivoted levers adapted to cooperate with said plate and each having a plurality of stops located in different planes, means to shift the levers in opposite directions to bring the desired stop into cooperative relation with said projections, a manipulative device for controlling said means for shifting said levers in one direction, and a plurality of manipulative devices, any one of which is adapted to control said means for shifting said lever in the opposite direction.

11. In a cash register adapted for use in item entering and total taking operations, the combination of a total control member adapted to be moved to a plurality of positions on total taking operations, a plurality of manipulative devices operative on item entering operations, and stopping means positioned by the manipulative devices for determining the position in which said total control member will be stopped on total taking operations.

12. In a cash register adapted for use in item entering and total taking operations, the combination of a plate adapted to be moved to a plurality of positions on total taking operations, a plurality of projections on said plate, a plurality of levers adapted to cooperate with said projections, and means operated during item entering operations for moving said levers into cooperative relation with said plate to control its movement on total taking operations.

13. In a cash register, the combination of a movable plate carrying a plurality of stops, levers adapted to cooperate with said stops, a plurality of manipulative devices adapted to move said levers into cooperative relation with said stops, and other manipulative means for determining which of said levers will be effective.

14. In a cash register, the combination of an oscillating plate, a plurality of projections carried by said plate, a plurality of levers, each having a plurality of stops, a plurality of banks of depressible keys adapted to move certain of said stops into cooperative relation with said projections, and another bank of keys for determining which of said stops will be effective.

15. In a cash register, the combination of a manually adjustable total controlling plate, a bank of depressible keys, and means actuated by the depression of one of said keys for limiting the adjustment of said plate.

16. In a cash register, the combination of a manually adjustable total controlling plate, a bank of depressible keys, an adjustable bar moved by the depression of one of said keys, means for stopping said plate in a certain position, and connections between said stopping means and said bar for rendering said stopping means effective.

17. In a cash register, the combination of a manually adjustable total controlling plate, a bank of depressible keys, a normally ineffective stop lever adapted to cooperate with said plate, and means for moving said stop lever to its effective position upon the depression of one of said keys.

18. In a cash register, the combination of a manually adjustable total controlling plate, a bank of depressible keys, a normally ineffective stop lever adapted to cooperate with said plate, a second lever connected to said stop lever, and means for actuating said last mentioned lever under the control of said keys to move said stop lever to its effective position.

19. In a cash register, the combination of a manually adjustable plate, a plurality of stops for said plate, a plurality of banks of keys for controlling said stops, means for holding said keys in their depressed positions, an additional bank of control keys, and means rendered effective upon depression of a certain key in said last mentioned control bank for preventing the release of a depressed key in either of the first mentioned banks during a plurality of operations.

20. In a cash register, the combination of a manually adjustable plate, a plurality of stops for said plate, a plurality of banks of keys for controlling said stops, means for holding certain of said depressed keys in their depressed positions during a plurality of operations, an additional bank of control keys, means rendered effective by the depression of a certain key in said control bank for preventing the release of a depressed key in either of the first mentioned banks during a plurality of operations, and means under control of any of the remaining keys in said control bank for rendering said preventing means ineffective.

21. In a cash register, the combination of a manually adjustable plate, a plurality of stops for said plate, a plurality of banks of keys for controlling said stops, means for holding certain of said depressed keys in their depressed positions during a plurality of operations, an additional bank of control keys, a differentially movable segment positioned under control of said last-named control bank, and means carried by said segment for preventing the release of a depressed key in any of said first mentioned banks of keys.

22. In a cash register, the combination of a manually adjustable plate, a plurality of stops for said plate, a plurality of banks of keys for controlling said stops, means for holding certain of said depressed keys in their depressed positions during a plurality of operations, an additional bank of control keys, and a differentially movable member, the position of which will determine whether a depressed key in any of said banks will be released.

23. In a machine of the class described, the combination of a plurality of banks of keys, a control lever adjustable into positions corresponding to said banks for controlling the machine for total taking operations, and means controlled by a key in a bank for determining the proper positioning of said lever.

24. In a machine of the class described, the combination of a total control lever having a plurality of positions of adjustment, two banks of keys, the operation of which determines the stopping of said lever in a position appropriate to the bank operated, and a special key which, when operated in combination with a key in either of the two banks mentioned, will determine the positioning of the lever in the position appropriate to the other one of the said two banks of keys.

25. The combination of a plurality of keys, an adjustable member, means controlled by one key for controlling the adjustment of said member, and means controlled by another key for changing the control exercised by said first mentioned key through said first mentioned means.

26. The combination of a plurality of sets of keys, an adjustable member, and a stop device adjusted under conjoint control of a key in each set for arresting said member in either of two predetermined positions.

27. The combination of a plurality of keys, an adjustable member, means under control of one key for arresting said member in one position of adjustment, and means under control of said key and another key for arresting said member in another position of adjustment.

28. The combination of a key, a member adjustable in opposite directions from home position, and a stop device controlled by said key for arresting said member when moved in either direction.

29. In a cash register, the combination of a normally idle stop means having a plurality of effective positions, an adjustable member adapted to be arrested at one or another point by said stop means, a plurality of keys, any of which controls the stop means to effect the arrest of the adjustable member at one point, and a second control means to shift the stop means to another of its effective positions.

30. In a cash register, the combination of a normally idle stop means having a plurality of effective positions, an adjustable member adapted to be arrested at one or another point by said stop means, and devices to adjust said stop for variously affecting the same to effect the arrest of the adjustable member at one or another of its positions.

31. In a cash register, the combination of a member having stops thereon, means for moving said member, a pivoted member having a plurality of lugs adapted to cooperate with said stops to stop said member in different positions, and manipulative means for controlling said pivoted member.

32. In a cash register, the combination of a plate carrying stops, a member adapted to cooperate with said stops, manipulative means for placing said member in cooperative relation with said plate, a differentially adjustable means for moving said member laterally to change said cooperative relation and an additional manipulative device to control said differential means.

33. In a cash register, the combination of a plate having stops thereon, manipulative means for moving said plate, a lever adapted to cooperate with said stops, means for controlling the movement of said lever in one direction, and cam means for moving said lever laterally with relation to said plates.

34. In a cash register, the combination of a plate adapted to be moved to one of a plurality of positions, a plurality of projections on said plate, a member adapted to cooperate with said plate and having a plurality of stops located in different planes, and means for shifting said member to bring a certain one of said stops into the plane of said plate.

In testimony whereof I affix my signature.

BERNIS M. SHIPLEY.